Aug. 18, 1959     F. M. MAYES     2,899,751
TANK GAUGE

Filed March 10, 1955     4 Sheets-Sheet 1

INVENTOR.
FRED M. MAYES
BY
ATTORNEYS

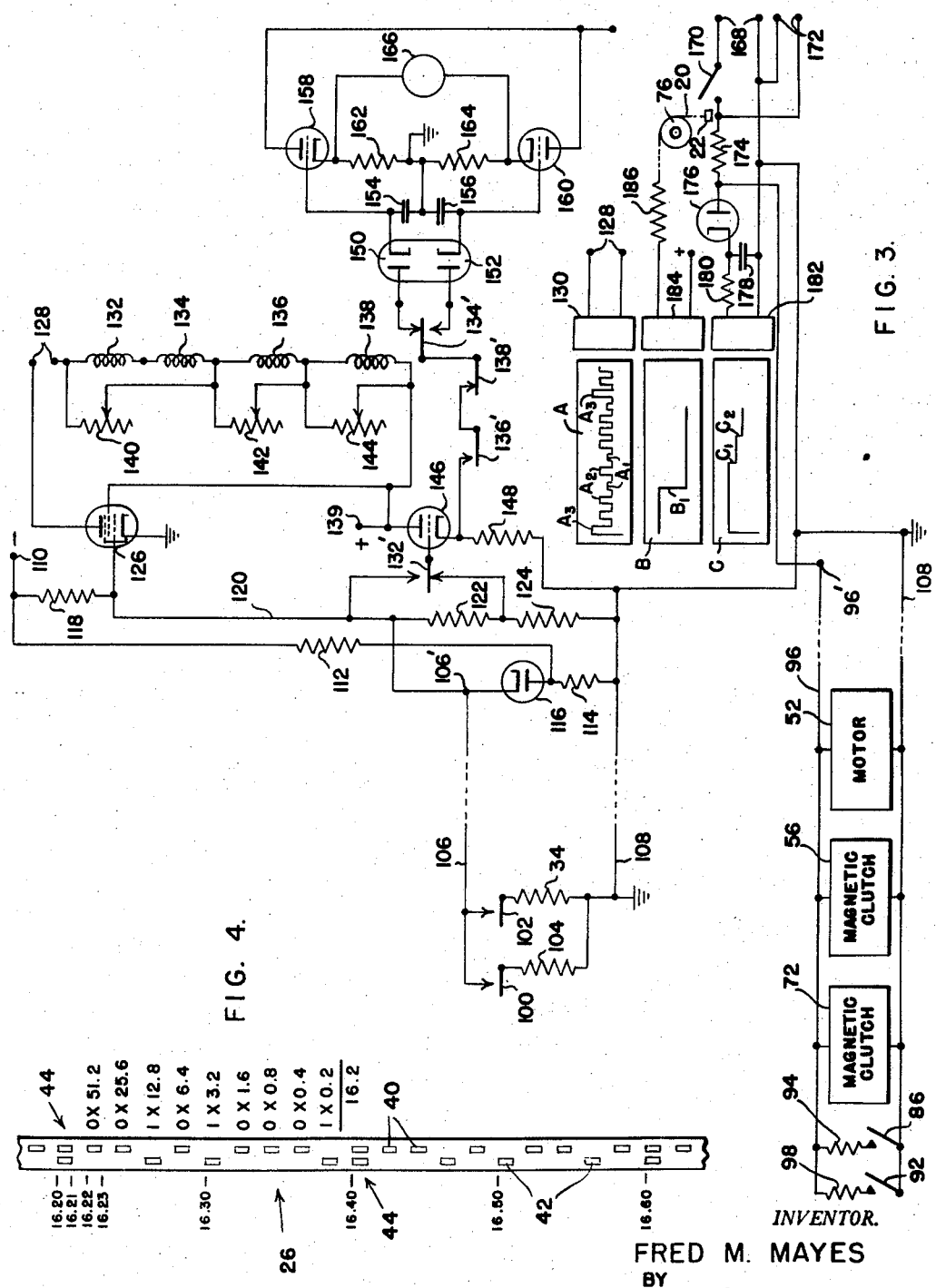

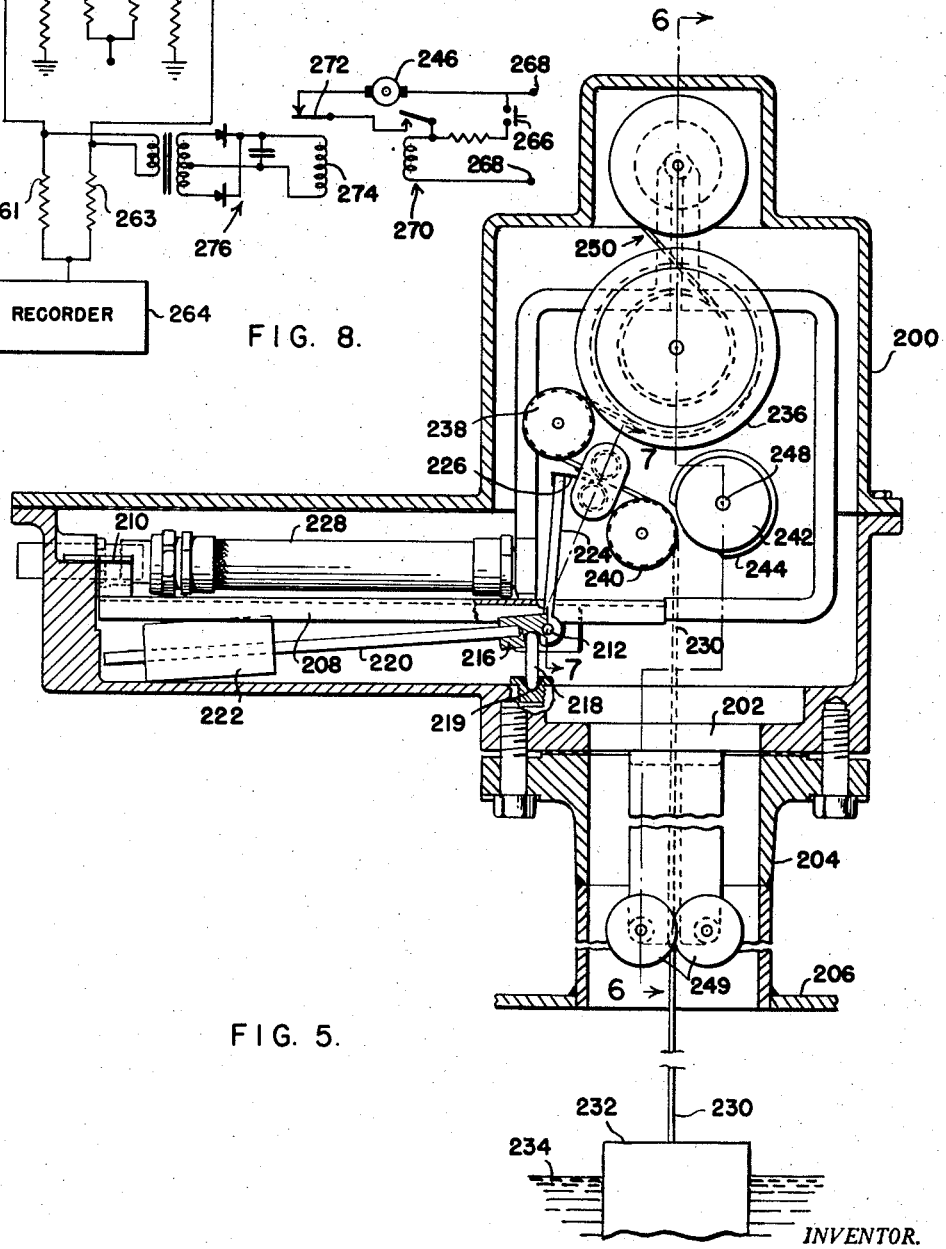

Aug. 18, 1959  F. M. MAYES  2,899,751
TANK GAUGE
Filed March 10, 1955  4 Sheets-Sheet 4
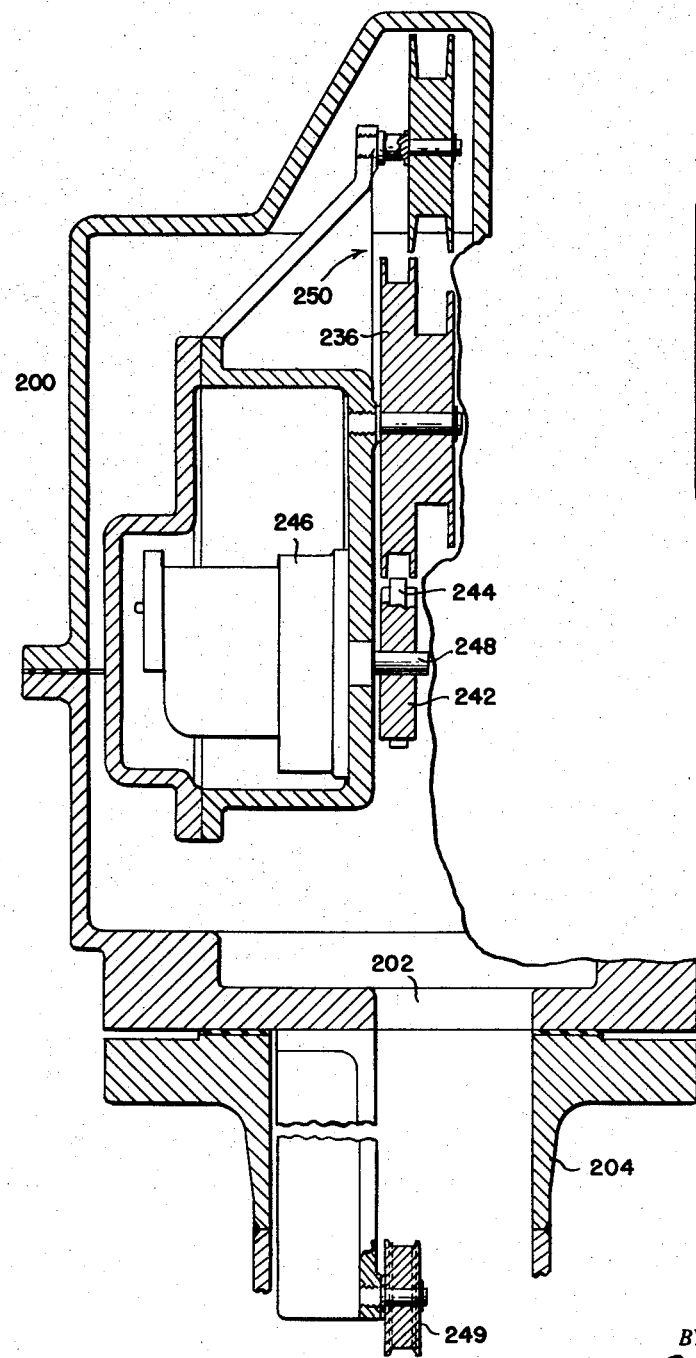
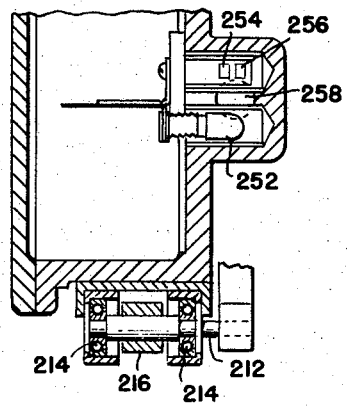
FIG. 7.
FIG. 6.
INVENTOR.
FRED M. MAYES
BY
ATTORNEYS 
United States Patent Office 2,899,751
Patented Aug. 18, 1959

2,899,751

TANK GAUGE

Fred M. Mayes, Newtown Square, Pa., assignor to Sun Oil Company, Philadelphia, Pa., a corporation of New Jersey Application March 10, 1955, Serial No. 493,367

8 Claims. (Cl. 33—126.6)

This invention relates to tank gauges and, particularly, to means operating automatically to transmit tank gauge readings to a remote recording or reading location.

While the invention is applicable to the gauging of tanks containing liquids of many types, for simplicity of description the invention will be described primarily with reference to the gauging of tanks containing petroleum products which will be generically referred to as "oil." The gauging of oil tanks is of primary economic interest and is particularly illustrative of the numerous problems which arise in this practice.

Oil tanks are generally of two types: first, the type having a closed roof involving a vapor space above the liquid oil level, and second, the type in which a floating roof is provided resting upon and supported by the oil. In the latter case, the roof is generally formed to receive and hold rainwater, by the weight of which it is deflected giving rise to a variable relationship between the quantity of oil and a particular point of the roof. In both types of tanks it is almost inevitable that underlying the oil there is more or less water.

The ultimate objectives of gauging are generally to determine the mass of oil stored in the tank and to determine the location of interfaces existing in the tank. The actual measurements generally made are of levels. To translate these into quantities account must be taken of temperatures, which in a large tank may vary considerably at different portions thereof, changes of tank dimensions due to temperatures and pressures, and other factors such as, in the case of floating roof tanks, accumulated water on the roof and the distortions of the roof due thereto as well as to temperature. From the level measurements which are directly made, taking into account these other matters, there are calculated the quantities ultimately desired. While numerous attempts have been made to make corrections automatically, the complexities of apparatus involved are not generally justified by the accuracy of results obtainable, and, hence, usually only levels are measured, corrections being made on the basis of the information secured from such measurements.

It is desirable, however, to provide level information at locations remote from the tank or tanks. This is particularly true in the case of a so-called tank farm, where it is desirable to transmit the gauging data over distances which may run to several thousand feet or even to several miles. Most desirable, for example, is the provision of arrangements whereby the gauge data from a large number of tanks may be transmitted to a central station. In view of the complexity of the apparatus required for recording of data from a single tank, it is desirable to provide, as far as possible, a single apparatus which will properly record the data received from a large number of tanks, with maintenance of the apparatus assignable to a single tank as simple as possible.

The remote transmission of data is, however, a matter of considerable difficulty if a high degree of accuracy is to be maintained. In general, the prior practice in automatic gauging has involved the location of a rather elaborate transmitter at each tank to translate readings to signals suitable for remote transmission. Such signals, if their magnitudes carry the information, are susceptible to changes due to inevitable changes in the transmission lines involved and difficulty is found in securing and maintaining sufficient accuracy. The problem involved may be best appreciated by considering that satisfactory gauging at the present time involves the necessity for level measurements to an accuracy of about one-eighth inch while the total level changes which may be involved may well range over fifty feet. Measurements are thus required to an accuracy of about one part in five thousand.

One object of the present invention is to provide gauging means capable of providing and transmitting level measurements well within the requirements just indicated.

A further object of the invention is to provide transmission of pulse-type signals to remote locations and of such character as to be recordable directly by devices such as electrical typewriters.

A further object of the invention is to provide means which involves a minimum of apparatus associated with an individual tank and adapted to transmit signals which may be switched at a remote location so that the readings from a large number of tanks may be recorded in a single recording apparatus.

Due to the fact that the signals are transmitted in the form of coded pulses, the characteristics of the transmission lines are immaterial and, consequently, inexpensive lines and layouts may be used.

The foregoing and other objects of the invention particularly relating to details of construction and operation will become apparent from the following description read in conjunction with the accompanying drawings, in which:

Figure 3 is a wiring diagram illustrating the electrical circuitry involved in transmission and recording of the gauging data;

Figure 4 is a fragmentary elevation of a coded tape used in accordance with the invention;

Figure 5 is a sectional view showing a transmitter such as may be used in the gauging of a tank of closed roof type;

Figure 6 is a section through the device of Figure 5 taken on the broken surface indicated at 6—6 in Figure 5;

Figure 7 is a fragmentary section taken on the broken surface indicated at 7—7 in Figure 5; and Figure 8 is a wiring diagram showing electrical connections involved in the use of the apparatus of Figure 5.

Figure 1:
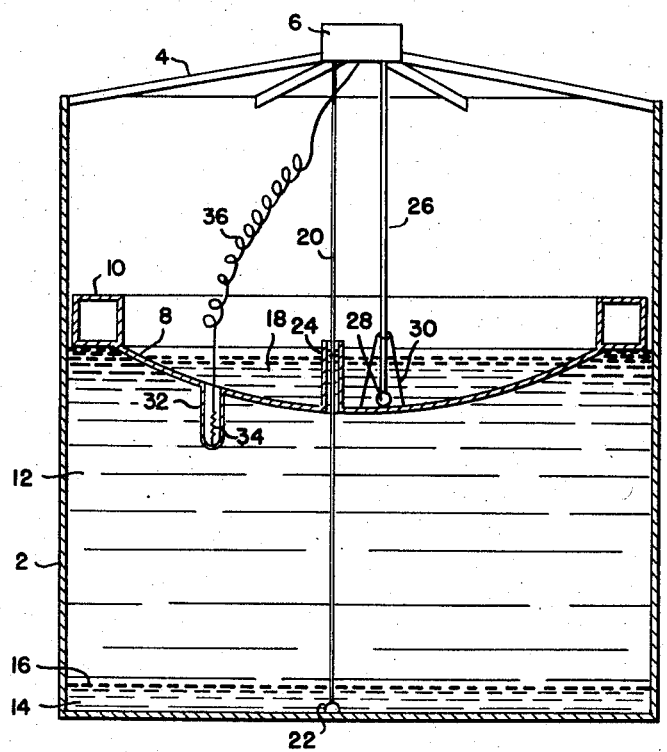
Figure 1 is a diagrammatic view showing a floating roof tank of such type that the gauging thereof presents major difficulty.

Referring first to Figure 1, there is indicated at 2 a tank of the floating roof type which is surmounted by a supporting frame 4 carrying a gauging transmitter 6 provided in accordance with the present invention. The floating roof of the tank is indicated at 8 and includes a pontoon 10 containing air which provides the buoyancy to maintain the roof floating on the surface of the oil 12. A layer of water is shown at 14 below the oil, the oil-water interface being indicated at 16.

Extending downwardly from the transmitter is an insulated wire 20 which at its lower end carries a weight electrode 22 which, as will appear, is provided to determine the location of the oil-water interface 16. The wire 20 passes through a tube 24 which serves to form a boundary for the water 18 in the roof. A coded tape 26 extends downwardly from the transmitter 6 and carries at its lower end a weight 28 buoyantly supported by the water 18. The weight and tape 26 are restrained against lateral swinging movements by an open cage 30 which is provided with an opening at its upper end smaller than the weight to arrest its upward motion.

A resistance thermometer bulb 32 is supported by the roof so as to be immersed in the oil 12, the resistance 34 therein being connected by a flexible lead 36 to the transmitter.

Reference may now be made to Figure 4 which shows the form of the tape 26. This tape may be in the form of a thin flexible steel ribbon which is perforated with rectangular openings as follows:

The openings are provided in two series extending lengthwise of the tape, the openings of the right-hand series being designated 40 and the openings of the left-hand series being designated 42. While, as will be evident, the dimensions may be otherwise, it may be assumed that each of these perforations has a dimension lengthwise of the strip equal to 0.01 foot and that the spacings between adjacent perforations lengthwise of the strip is also 0.01 foot. (It will be noted that 0.01 foot is approximately equal to one-eighth inch, the minimum length desired to be measured).

As indicated in Figure 4, there is either a perforation 40 or a perforation 42 centered about each 0.02 foot interval along the length of the tape. At the location of every tenth of such 0.02 intervals there appear side by side a pair of the perforations 40 and 42 as indicated at 44. Accordingly, at intervals of 0.2 feet, such pairings of the perforations occur. Between these pairs the perforations are either in the group 40 or in the group 42, without pairing.

Disregarding first whether the successive perforations are in the group 40 or 42, it will be evident that the successive beginnings and ends of the perforations measure intervals of 0.01 foot, and assuming that the upper ends of the topmost pair of perforations 44 represent 16.20 feet, it will be evident that successive hundredths of feet will be represented by the locations indicated at the left of Figure 4.

The perforations carry further information, however, serving to identify the particular 0.2 foot intervals represented by the upper ends of the pairs 44. For this purpose, a binary coding system is used which follows the system indicated at the right of Figure 4. Reading upwardly in the group associated with the numbers at the right of Figure 4, the successive unpaired perforations are in positions corresponding to one-tenth of successive powers of 2. Perforations in the right-hand group 40 indicate a zero multiplier, while perforations in the left-hand group 42 indicate a unit multiplier. It will be noted that the binary coding provided below the uppermost pair 44 (which, as stated, mark the length 16.20 feet) sums to 16.2, thereby identifying the length value to be ascribed to the upper ends of the paired perforations just mentioned. Similarly, the perforations below the pair marking the length 16.4 feet are coded in the binary system to give the indication 16.4. As will be evident hereafter, the arrangement described thus serves for the identification of every 0.01 foot interval unambiguously. The coding system, as will be evident, is capable of indicating lengths up to 102.4 feet without ambiguity, and, of course, even greater lengths may be identified by a repetition of the coding taking into account the fact that there could be readily ascertained the range of approximately 100 feet to which the coding applied.

Figure 2:
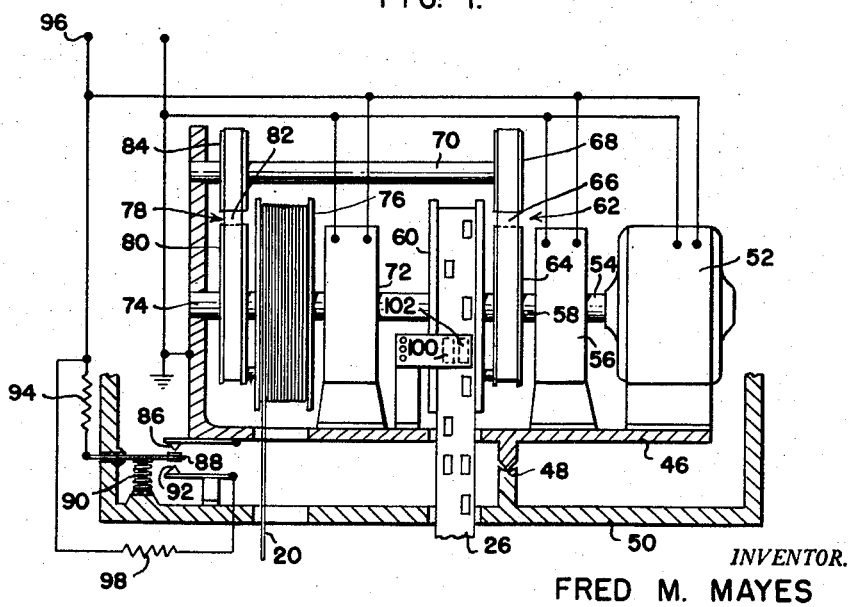
Figure 2 is an elevation showing the apparatus associated with the tank of Figure 1 for transmitting the required data therefrom.

The details of the transmitter 6 located at the top of the tank are shown in Figure 2. Within the housing there is a beam 46 supported on a knife edge 48 by the base 50. The beam 46 carries a motor 52 the shaft 54 of which is arranged to be coupled by a magnetic clutch 56 to a shaft 58 which carries the reel 60 for the perforated tape 26. Also secured to the shaft 58 is a constant tension spring arrangement generally indicated at 62 and comprising a reel 64 which carries the spring element 66 which normally tends to wind upon a reel 68 journalled on a pin 70. As will appear, when the magnetic clutch is disengaged, the spring assembly 62 tends to maintain the tape 26 in fully extended condition under constant tension.

The shaft 58 is arranged to be connected through a magnetic clutch 72 to another shaft 74 on which is secured the reel 76 for a single layer of the insulated wire 20, electrical connection to this wire being provided through a brush arrangement, not shown. A constant tension spring arrangement indicated at 78 is provided to impart a constant torque to the shaft 74 to maintain the insulated wire 20 in taut condition under constant tension. This spring arrangement comprises the reel 80 secured to shaft 74, a spring element 82, and the reel 84 which is journalled on the pin 70. The beam 46 and the elements which it carries are normally adapted to tilt downward toward the right, as viewed in Figure 2, against the tensions exerted by tape 26 and wire 20, its motion being limited by a suitable stop, not shown.

The beam 46 is electrically grounded and carries a contact 86 which is arranged to engage a contact on a leaf 88 which is mounted on the base in insulated relationship thereto, the leaf 88 being upwardly tensioned by a spring 90 though not forced upwardly to an extent normally to make contact with 86. Below the leaf 88 there is another fixed contact 92 normally spaced therefrom. The leaf 88 is connected through a resistor 94 to a lead 96 to which the contact 92 is also connected through a resistor 98. As indicated in Figures 2 and 3, the motor 52 and the magnetic clutches 56 and 72 are also connected between lead 96 and ground. The lead 96 is connected to the remote recording apparatus at a terminal 96'.

A pair of switches 100 and 102 which may be of the microswitch type are arranged, respectively, to sense the leading and trailing edges of the perforations 42 and 40, respectively, as the tape moves upwardly. The arrangement is such that as soon as a leading edge of a perforation engages the corresponding switch the switch is closed, while the action of the trailing edge of a perforation opens the corresponding switch. As illustrated in Figure 3, one side of each of these switches is connected to a line 106 running to the remote recording apparatus at terminal 106'. The other side of switch 100 is connected through a standard resistance 104, which may be considered to have the value of 150 ohms, to ground. The other side of switch 102 is connected through the thermometer bulb resistance 34 to ground. The resistance 34 will be assumed to have a mean value of 100 ohms, temperature changes in the oil resulting in variation of this resistance value.

A ground connection 108 may run from the transmitter to the recording apparatus and serves as a common ground for all of the elements of the transmitter. Under these circumstances, it may be noted that only three wires are required to run from the transmitter to the recording apparatus, and, as will become evident, the cable involved need not be of special type to secure proper transmission of signals.

Referring now particularly to the recording apparatus, a terminal 110 thereof is supplied with a relatively high negative potential of the order, for example, of 150 volts. This terminal is connected through the series arrangement of resistors 112 and 114 to ground. The junction of these resistors is connected to the anode of a diode 116, the cathode of which is connected to the terminal 106' previously referred to. The potential at the anode of diode 116 is thus limited to insure that no more than a predetermined maximum negative potential is applied to the terminal 106'.

A resistor 118 connects terminal 110 through connection 120 to an arrangement of two resistors 122 and 124 in series to ground. Consistent with figures already given, the resistor 122 has one-half the resistance of resistor 124.

The connection 120 is joined to the control grid of a pentode 126 the cathode of which is grounded. The anode of pentode 126 is connected through terminals 128 in series with a recorder 130 and in series with relay coils 132, 134, 136 and 138 to a source 139 of positive potential. Shunted across the series arrangement of coils 132 and 134 is a variable resistance 140 whereby the sensitivity of operation of their relays is controlled. Similar variable control resistances 142 and 144 are shunted across the coils 136 and 138. The contacts of the respective relays comprising the coils 132, 134, 136 and 138 are indicated at 132′, 134′, 136′ and 138′. The contact 132′ normally occupies the lower position shown wherein it is connected to the junction of resistors 122 and 124. When the coil 132 is energized, contact 132′ is moved upwardly to engage the line 120. The contact 132′ is connected to the grid of a triode 146 arranged as a cathode follower with the cathode resistor 148 connected to ground. When coil 136 is deenergized, its contact 136′ is disengaged from the cathode of triode 146, engagement being made when the coil 136 is energized. Connected to contact 136′ when the coil 138 is deenergized is contact 138′ to which is, in turn, connected the contact 134′ normally closing its upper contact when coil 134 is deenergized and closing its lower contact when this coil is energized. Connection is thus alternately made with the respective anodes of diodes 150 and 152, the respective cathodes of which are connected to the ungrounded terminals of capacitors 154 and 156 which are also connected to the control grids of triodes 158 and 160 acting as cathode followers, being provided with resistors 162 and 164 running to ground. A meter 166 connected between the cathodes of triodes 158 and 160 serves to give a reading of temperature as will appear hereafter.

The usual 110 volt alternating current supply is provided at terminals 168 through the main switch 170 from which current is delivered through terminals 172 to drive the recorders. It may be here mentioned that while, for simplicity, separate recorders are diagrammatically indicated, there would, if tape recording were used, normally be utilized only a single recorder having three recording elements to produce side by side graphs on a single recording sheet.

The alternating current is also supplied through switch 170 and a resistor 174 to the terminal 96′ previously referred to. Terminal 96′ is also connected to a rectifying diode 176 to supply a direct signal through the filter arrangement of capacitor 178 and resistor 180 to a recorder 182.

A third recorder 184 has one terminal connected to a source of direct current supply and the other terminal through a current limiting resistor 186 to the wire 20 connected to electrode 22. The recorders 130, 184 and 182 are respectively arranged to record on charts A, B and C, through, as noted above, actually they represent stylus operating elements which would record side by side on a single sheet. The operation of what has been described is as follows:

Under ordinary conditions, the switch 170 is open, and consequently the motor 52 and the magnetic clutches 56 and 72 are deenergized. In the tank the electrode 22 is in its lowermost position resting on the bottom of the tank, the spring assembly 78 imparting sufficient tension to maintain the wire 20 in taut condition but insufficient to raise the electrode. The water in the bottom of the tank is conductive and, accordingly, current flows through the recorder 184 holding its recording element in position indicating the current flow.

The weight 28 has a density greater than that of the water 18 and is normally rests on the floating roof. The spring arrangement 62 imparts sufficient tension to the tape 26 to hold the tape in taut condition but insufficient to raise the weight 28.

When it is desired to secure a reading, the main switch 170 is closed, starting the recorder chart drives and energizing the motor 52 and the magnetic clutches 56 and 72. The motor then starts to raise the wire 20 and tape 26. A rise of these elements starts, the force exerted on the beam 46 is insufficient to tilt it downwardly toward the left and, consequently, the contacts at 86 and 92 are not closed.

As the tape is wound up, the switches 100 and 102 are closed in accordance with the respective perforations therein, thereby producing selective closures of the circuits through the resistors 104 and 34. The resistor 118 has a quite high resistance value compared with the resistors 104 and 34, for example, having a resistance of around 3,000 ohms, so that the high negative bias applied to the control grid of pentode 126 is substantially dropped when either of the switches 100 or 102 is closed. The result is that the recorder 130 produces a record such as indicated at A. When the switch 100 alone is closed, a relatively low current flows through the recorder giving rise to pulses such as $A_1$. On the other hand, when the switch 102 alone is closed, intermediate pulses such as $A_2$ are produced, due to the lower resistance at 34 as compared with the resistance at 104. When both switches 100 and 102 are simultaneously closed by the simultaneous occurrence of perforations of the pairs of the type 44 at the switch positions, a still lower resistance is involved with consequent high pulses such as $A_3$. The result is a pulse pattern such as indicated at A, from which it will be obvious that this pulse pattern provides a replica of the pattern of perforations on the tape. The pattern thus produced indicates the tape position at the initiation of the recording operation and serves to provide markings, by the beginnings and the ends of the pulses, indicative of 0.01 foot intervals. The operation of the recorder is continued to produce a movement of the tape of sufficient extent, for example, in excess of 0.4 foot (though less movement would still give determinable results) so that the record produced also reflects the binary coding to give a clear indication of the 0.2 foot interval involved in the initiation of movement of the tape.

As the tape continues to rise, its weight 28 reaches the position of leaving the surface of the water 18. As it does so, an additional force is applied to the beam 46 to tilt it downwardly to the left producing contact between 86 and leaf 88. As the float 28 completely leaves the water, the force thus applied is not sufficient to overcome the force exerted by spring 90 and, consequently, contact of 86 with leaf 88 is closed without closure of the contact at 92. From previous calibration it will be known what the precise position of the weight is as the beam 46 thus tilts, so that the depth of the water on top of the floating roof may be accurately ascertained from the result of the closure of contacts just mentioned. Referring to Figure 3, it will be noted that this closure of contacts provides for current flow through resistor 94. Due to the series resistor 174 there is produced a drop of potential at the anode of diode 176 which is reflected in a reduction of direct current through recorder 182 with the result that there is produced on the chart C a step $C_1$. By alignment of the chart C with chart A, it will be evident how much movement of the tape occurred before the beam 46 tilted, thus giving a measure of the depth of the water on the roof.

As the tape continues to move upwardly, the weight 28 will engage the stop provided by the upper end of the cage 30, and when this occurs, a sufficient force is applied to the beam 46 to cause it to flex the leaf 88 into contact with the fixed contact 92. The result is the insertion of the resistor 98 in parallel with the resistor 94 producing another drop of potential applied to the recorder 182 and thus producing a second step $C_2$. When the tape is thus brought to rest, the motor 52 is arrested. This motor may be quite small, and operates on a low current even at the minimum current which exists when both resistors 94 and 98 are brought into the circuit. The total travel of the tape is, as stated, sufficient to give a record at A necessary to identify the position of the tape both at initiation of its movement and the end of its movement, and the level of the oil may thus be ascertained from either. (What is, of course, indicated is the level of the roof, and corrections may have to be applied from known calibration to ascertain the volume beneath the roof in view of its shape and the possible distortion occasioned by the presence of more or less water thereon.)

The raising of electrode 22 is initiated simultaneously with the initiation of rise of tape 26. So long as the electrode remains in the water, current flows therethrough. As it passes into the oil layer, this current is interrupted giving the record $B_1$ on chart B. By comparison with the chart A, the extent of motion of the electrode is ascertained, thereby giving the depth of the water layer.

There may now be considered the operations involved in giving a temperature indication on the meter 166.

When both switches 100 and 102 are open, all of the relay coils 132, 134, 136 and 138 are open and their contacts occupy the positions illustrated in Figure 3. Under this condition, the cathode of the triode 146 has a positive potential which may be regarded as a reference base potential determined by the connection of its grid to the junction of resistors 122 and 124, the potential of the grid then being, negatively with respect to ground, essentially two-thirds of that appearing at the anode of diode 116. Switch 126 being open, no signal is applied to diode 150. When the switch 100 is closed, the current from pentode 126 is sufficient to energize coil 136 to cause it to close the contact 136'. This applies two-thirds of the potential across resistor 104 to the grid of the cathode follower triode 146, whereupon a corresponding signal of positive sign is applied to diode 150 to charge capacitor 154 which accumulates this signal.

When switch 102 alone is closed, the lower resistance appearing at 34 produces a still higher current through the relay coils causing contacts 132' and 134' to be actuated, the former to its upper position and the latter to its lower position, as well as contact 136' which is closed. The result is that the grid of triode 146 has applied to it the full potential across resistor 34, and the corresponding positive signal is delivered through the diode 152 to capacitor 156 which accumulates this signal.

When both switches 100 and 102 are closed simultaneously, relay coil 138 is additionally energized to open its contact 138'. Under these conditions, then, no signal is applied to either of the capacitors 154 or 156.

The potentials accumulated on the capacitors 154 and 156 are reflected in the currents through resistors 162 and 164, and the meter 166 responds to the difference of these currents. In view of the linear characteristics of the cathode follower 146 and of the cathode followers 158 and 160, a linear signal is provided on meter 166 corresponding to the variations of the resistor 34 with temperature. An accurate temperature indication is thus secured, the meter 166 being desirably calibrated in terms of temperature.

Compensation for lead wire resistance can be provided by adding a small copper wire resistance equal to one-half the resistance of line 106 to the standard resistance 104. Other minor corrections or compensations may be made as required, as, for example, to take into account the fact that resistor 118, though having a high resistance, will enter into the effective results to some extent.

It will be evident from the foregoing that there are provided records giving all the necessary data, assuming initial calibration of the tank characteristics, required to secure accurate indications of the amounts of oil and water in the tank.

Due to the fact that the signals to the charts are in pulse form, there being no dependence for accuracy upon their magnitudes, there is no limitation imposed on the distance of separation of the tank from the recording apparatus. Furthermore, while chart recording has been described, it will be evident that the pulse signals may be utilized in a recorder of the printing type, there being provided known types of translating apparatus to translate the pulse indications into a printed record.

Furthermore, due to the independence of operation with respect to capacitances of conducting lines or other disturbing matters, it will be evident that a single recording assembly may be connected by switching means to any number of tanks which are to be gauged. Thus, a single recording station is sufficient for the gauging of all of the tanks in a large tank farm, there being individual to the tanks only the portion of the apparatus illustrated in Figure 2 and the connecting cable running therefrom to the recording station.

It will further be evident that the apparatus described may be used in simpler form in the event that some of the measurements are not desired. If the floating roof is assumed not to tilt, the tape and insulated wire assembly and the transmitter may be mounted more conveniently at the end of the tank. If deformation of the roof under water loading is not involved, it will be evident that the elements of the apparatus having to do with measurement of water level on the roof may be eliminated. The oil-water interface may be measured in various other ways. If temperature recording or reading is not desired, other matters of simplification may be adopted as will be obvious.

Since in many instances it is desired only to measure the oil level in a tank of the closed roof type, there may now be described a preferred form of apparatus of relatively simple type for making such measurements.

Referring to Figures 5, 6 and 7, a housing 200 provided with an opening 202 is mounted upon a fitting 204 secured to the top of the tank 206. Within the housing is a beam 208 which is secured to the housing through leaf springs 210 desirably of such form as to permit free tilting about an axis perpendicular to the plane of Figure 5 but restraining other freedom of the beam. The beam is mounted through ball bearings 214 upon a shaft 212 to which is secured a member 216 mounting a rod 220 along which there may be adjustably set a weight 222. The member 216 is mounted upon a pin 218 which is free to rock in a socket provided in a member 219. The shaft 212 carries an arm 224 which supports a shutter 226 for a purpose hereafter described.

Electrical connections to the devices carried by the beam 208 are provided through a flexible tube 228 serving to isolate the electrical connections from the vapor space of the tank.

A tape 230 which may be identical with, or similar to, the tape 26 previously described supports at its lower end a float 232 arranged to be buoyantly supported by the liquid 234. The tape 230 is wound upon a reel 236 and passes therefrom about an idler 238 and then about a roller 240 from which it passes vertically through guide rollers 249, extending from them into the interior of the tank where it supports the float. A feeding wheel 242 is provided about part of its periphery with a rubber facing 244 which is arranged to engage the tape backed by the roller 240 when roller 242 is driven clockwise through shaft 248 by the motor 246. A spring assembly of the constant tension type indicated at 250 serves, as in the previous modification, to impart a substantially constant tension to the tape when it is free for movement to maintain it in taut condition. The tension thus applied should be merely that sufficient to maintain the tape stretched without imparting substantial lift to the float. All of the parts just mentioned are carried by the beam 208 and are normally counterbalanced by the weight 222 to maintain the assembly in the condition illustrated.

The assembly carried by the beam 208 also mounts a lamp 252 and a pair of photoelectric devices preferably in the form of phototransistors indicated at 254 and 256 the viewing windows of which are opposite the two series of perforations in the tape which passes through the opening 258 in its extent between the rollers 238 and 240. The shutter 226 previously referred to is arranged to pass between the lamp 252 and the phototransistors. The lamp and phototransistors are desirably surrounded by glass envelopes to provide complete isolation of the electrical system from the vapor space in the tank, the motor 246 also being enclosed in a separate housing as illustrated.

The electrical connections involved in this modification are simple and shown in Figure 8. The outputs from the phototransistors may be fed to individual amplifiers 260 and 262 which feed a recorder 264 which may either be provided with a pair of styluses for recording pulses or, as shown, may have a single stylus fed through resistors 261 and 263 which add the amplifier outputs, the resistors being of different values to give rise to a record similar to that shown at A. The motor 246 is connected in a circuit which will provide for its starting and continued operation but will serve also to stop the motor at the end of a proper cycle. To this end, alternating current input terminals 268 are connected so that the closure of a push button 266 will energize a holding relay 270 to energize the motor 246. The circuit also comprises the contact 272 of a relay 274, the contact normally being closed. A rectifier arrangement 276 receives the output from the amplifiers 260 and 262 to provide, as will appear, at proper times a direct current through the relay 274 to open the contact 272.

In the operation of what has been described, a momentary closure of the push button 266 will start the motor 246 which will continue to operate. In this operation the facing 244 of roller 242 will engage the tape 230 to lift it and the float. The float is so constructed and the counterweight 222 so set that a substantial length of the float must be withdrawn from the liquid before the force imparted to the beam 208 serves to move it downwardly raising the counterweight. The extent of motion thus required is that necessary to record a complete identification of the tape position in terms of the binary code referred to above. As soon as the critical force is reached which is indicative of a particular degree of emergence of the float, tilting of the beam occurs whereupon the shutter 226 is snapped between the lamp and the photocells thus cutting off further recording. The motor, however, continues to operate until the facing 244 clears the tape. When this occurs, the force exerted on the beam is relieved as the float and tape drop, and, consequently, the shutter 226 is withdrawn and pulses are again delivered from the amplifiers 260 and 262. A relatively high frequency current is thus produced by the tape perforations and this is rectified in rectifier 276 to provide current to the relay 274 which opens the contact 272 stopping the motor and releasing the holding relay 270 so that the stoppage of the motor is permanent until its operation is again initiated by a push button 266. The circuit constants are so chosen that during the relatively slow movement of the tape as the float is raised insufficient current is provided to operate relay 274.

The record will show a cessation of production of the pulses originating from the phototransistors occasioned by the movement of the shutter 226 to its occulting position, and it will be obvious that from the record thus produced and preliminary calibration the level of the liquid 234 may be accurately ascertained.

It will be evident that instead of using photoelectric devices such as described, tape carrying magnetic markings may be used or mechanical operation of switches may be effected by the tape as described in connection with the first modification. Numerous other changes in details of operation and construction will be evident to those skilled in the art and, accordingly, the invention is not to be construed as limited except as required by the following claims.

What is claimed is:

1. Apparatus for gauging liquid level comprising a member subject to buoyancy changes in traversal of a liquid surface, an elongated support for said member, means normally maintaining said member and said support in approximately constant relationship with said liquid surface during variations of level of said surface, means for imparting a limited range of vertical movement to said support and member to cause the member to deviate from said approximately constant relationship and to traverse the liquid surface, said limited range of vertical movement being small relatively to the range of liquid level change throughout which said approximately constant relationship is maintained, means responsive to variations in buoyancy of said member during said limited range of movement to provide an output signal upon the attainment of a predetermined relationship between said member and a liquid surface, means providing markings individually and uniquely identified with lengthwise increments of said support, means responsive to said markings and providing sequential output signals during said limited range of vertical movement of the support serving as a measure of position of said member, the positions of said markings relative to said responsive means changing with movements of said support during changes of liquid level and during said limited range of movement, and means receiving both the first mentioned signal and the last mentioned signals to provide indication of the position of said member at the time of occurrence of said predetermined relationship.

2. Apparatus for gauging liquid level comprising a member arranged to traverse a liquid surface, an elongated support for said member, means normally maintaining said member and said support in approximately constant relationship with said liquid surface during variations of level of said surface, means for imparting a limited range of vertical movement to said support and member to cause the member to deviate from said approximately constant relationship and to traverse the liquid surface, said limited range of vertical movement being small relatively to the range of liquid level change throughout which said approximately constant relationship is maintained, means providing an output signal upon the attainment of a prtdetermined relationship between said member and the liquid surface during said limited range of movement, means providing markings individually and uniquely identified with lengthwise increments of said support, means responsive to said markings and providing sequential output signals during said limited range of vertical movement of the support serving as a measure of position of said member, the positions of said markings relative to said responsive means changing with movements of said support during changes of liquid level and during said limited range of movement, and means receiving both the first mentioned signal and the last mentioned signals to provide indication of the position of said member at the time of occurrence of said predetermined relationship.

3. Apparatus according to claim 1 in which said member is a float and in which said support normally applies a substantially constant upward force to the float.

4. Apparatus according to claim 1 in which said markings are coded in groups, each of which groups corresponds to a small range of vertical movement of said member and provides complete indications of the corresponding position of the member.

5. Apparatus according to claim 2 in which said markings are coded in groups, each of which groups corresponds to a small range of vertical movement of said member and provides complete indications of the corresponding position of the member.

6. Telemetering apparatus comprising an elongated member provided with coded markings, said markings being disposed in two series extending lengthwise of said member and in successive groups distributed along the length of said member, each of the groups being of approximately the same length along the member as adjacent preceding and following groups, and the number of markings in at least some of the groups being considerably in excess of the number of lengthwise series of markings, said groups of markings being delimited by pairs of markings disposed side by side, one in each series, there being within each group only markings unpaired transversely of the member, the coding of the markings in each group being such that complete information embodied in the markings of each group and identifying the location of the group along the member involves all of the markings of that group, sensing means providing electrical signals and arranged for successive sensing of the markings in each group, said sensing means and member having a large range of relative movement such that the sensing means may sense all of the markings provided along said member, and means for imparting a small range of relative movement, in excess of the length of a group, between the member and the sensing means so that in each such small range of movement the sensing means will sense all of the markings in at least one group to provide signals indicating the portion of the large range of movement in which said small range of movement occurs.

7. Telemetering apparatus comprising an elongated member provided with coded markings, said markings being disposed in a plurality of series extending in parallel lengthwise of said member and in successive groups distributed along the length of said member, each of the groups being of approximately the same length along the member as adjacent preceding and following groups, and the number of markings in at least some of the groups being considerably in excess of the number of lengthwise series of markings, the coding of the markings in each group being such that complete information embodied in the markings of each group and identifying the location of the group along the member involves all of the markings of that group, a plurality of sensing means individual to said series providing electrical signals and arranged for successive sensing of the markings in each group, said sensing means and member having a large range of relative movement such that the sensing means may sense all of the markings provided along said member, and means for imparting a small range of relative movement, in excess of the length of a group, between the member and the sensing means so that in each such small range of movement the sensing means will sense all of the markings in at least one group to provide signals indicating the portion of the large range of movement in which said small range of movement occurs.

8. Apparatus according to claim 7 in which additional means is provided to emit a signal during said small range of relative movement to identify by its occurrence significant markings of said elongated member.

References Cited in the file of this patent

UNITED STATES PATENTS

| | | |
|---|---|---|
| 1,498,960 | Gardner | June 24, 1924 |
| 2,132,213 | Locke | Oct. 4, 1938 |
| 2,142,251 | Nanan | Jan. 3, 1939 |
| 2,216,069 | Doyle | Sept. 24, 1940 |
| 2,480,490 | Mark | Aug. 30, 1949 |
| 2,568,348 | McCauley | Sept. 18, 1951 |
| 2,627,660 | Smith | Feb. 10, 1953 |
| 2,659,072 | Coales et al. | Nov. 10, 1953 |
| 2,704,891 | Ferrier | Mar. 29, 1955 |

OTHER REFERENCES

| | | |
|---|---|---|
| 1,088,196 | France | Sept. 8, 1954 |